US012693412B2

(12) United States Patent
Seo et al.

(10) Patent No.: US 12,693,412 B2
(45) Date of Patent: Jul. 28, 2026

(54) METHOD AND APPARATUS FOR DETERMINING SENSOR INTEGRITY USING SIGNALS FROM AN ADJACENT SENSOR

(71) Applicants: HYUNDAI MOTOR COMPANY, Seoul (KR); KIA CORPORATION, Seoul (KR)

(72) Inventors: Chan Mi Seo, Bucheon-si (KR); Hyeon Jeong Jeon, Hanam-si (KR); Seung Hoon Jeon, Incheon (KR); Dong Hyuk Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 268 days.

(21) Appl. No.: 18/497,694

(22) Filed: Oct. 30, 2023

(65) Prior Publication Data

US 2024/0230895 A1     Jul. 11, 2024

(30) Foreign Application Priority Data

Jan. 9, 2023     (KR) ........................ 10-2023-0003015

(51) Int. Cl.
*G01S 15/931*          (2020.01)
*G01S 7/52*            (2006.01)

(52) U.S. Cl.
CPC ........ *G01S 15/931* (2013.01); *G01S 7/52004* (2013.01); *G01S 2015/932* (2013.01)

(58) Field of Classification Search
CPC .............. G01S 7/52004; G01S 15/931; G01S 2015/932
See application file for complete search history.

(56) References Cited

U.S. PATENT DOCUMENTS

| | | | | |
|---|---|---|---|---|
| 8,020,447 | B2 * | 9/2011 | Okuda .................. | G01S 15/876 |
| | | | | 73/628 |
| 9,409,574 | B2 * | 8/2016 | Gokan .................. | B60W 30/09 |
| 10,094,923 | B2 * | 10/2018 | Mossau ................. | G01S 15/931 |
| 10,281,566 | B2 * | 5/2019 | Hallek .................. | G01S 15/876 |
| 10,571,555 | B2 * | 2/2020 | Günzel .................... | G01S 7/527 |
| 11,719,545 | B2 * | 8/2023 | Konrardy .......... | B60W 30/0956 |
| | | | | 701/23 |
| 11,920,938 | B2 * | 3/2024 | Konrardy ............... | G01B 21/00 |
| 12,101,810 | B2 * | 9/2024 | Zhang ............... | H04W 72/0446 |
| 12,111,907 | B2 * | 10/2024 | Strong ................... | H04N 19/80 |

(Continued)

*Primary Examiner* — Abdallah Abulaban
*Assistant Examiner* — Amie M Ndure
(74) *Attorney, Agent, or Firm* — Lempia Summerfield Katz LLC

(57)          ABSTRACT

An apparatus for determining integrity of a sensor includes a signal transmission unit configured to sequentially operate each of a plurality of ultrasonic sensors mounted on a vehicle to generate respective output signals. The apparatus also includes a signal sensing unit configured to acquire a received value of an adjacent ultrasonic sensor adjacent to each of the plurality of ultrasonic sensors which generate the respective output signals. The apparatus further includes an anomaly determining unit configured to determine whether the received value is abnormal. The apparatus additionally includes a determination-result processing unit configured to perform a response for each of the ultrasonic sensors according to a result of determining anomaly.

9 Claims, 6 Drawing Sheets

(56)         References Cited

U.S. PATENT DOCUMENTS

| | | | |
|---|---|---|---|
| 2009/0071255 A1* | 3/2009 | Okuda | G01S 7/521 73/628 |
| 2015/0307091 A1* | 10/2015 | Gokan | G01S 7/539 701/70 |
| 2016/0291153 A1* | 10/2016 | Mossau | G01S 15/878 |
| 2016/0313438 A1* | 10/2016 | Hallek | G01S 15/876 |
| 2017/0045611 A1* | 2/2017 | Günzel | G01S 7/527 |
| 2020/0225348 A1* | 7/2020 | Shinkai | G01S 15/931 |
| 2022/0365210 A1* | 11/2022 | Lind | G01S 15/42 |
| 2023/0109507 A1* | 4/2023 | Kim | B60R 25/30 726/25 |
| 2023/0393252 A1* | 12/2023 | Lee | G01S 15/86 |
| 2023/0408688 A1* | 12/2023 | Lee | G01S 15/08 |
| 2024/0028041 A1* | 1/2024 | Klaus | G01S 17/931 |

* cited by examiner

| FIRST ULTRASONIC SENSOR | SECOND ULTRASONIC SENSOR | THIRD ULTRASONIC SENSOR | FOURTH ULTRASONIC SENSOR | DETAILS OF OPERATION |
|---|---|---|---|---|
| TRANSMISSION | RECEPTION | – | – | DETECTION OF ANOMALY OF FIRST ULTRASONIC SENSOR FROM CROSSTALK -SIGNAL DETECTION RESULT OF SECOND ULTRASONIC SENSOR |
| RECEPTION | TRANSMISSION | RECEPTION | – | DETECTION OF ANOMALY OF SECOND ULTRASONIC SENSOR FROM CROSSTALK -SIGNAL DETECTION RESULT OF FIRST AND THIRD ULTRASONIC SENSORS |
| – | RECEPTION | TRANSMISSION | RECEPTION | DETECTION OF ANOMALY OF THIRD ULTRASONIC SENSOR FROM CROSSTALK -SIGNAL DETECTION RESULT OF SECOND AND FOURTH ULTRASONIC SENSORS |
| – | – | RECEPTION | TRANSMISSION | DETECTION OF ANOMALY OF FOURTH ULTRASONIC SENSOR FROM CROSSTALK -SIGNAL DETECTION RESULT OF THIRD ULTRASONIC SENSOR |

*FIG. 4*

| LIST NO. | REFERENCE VALUE | | | |
| --- | --- | --- | --- | --- |
| | OPERATING SENSOR NO. | | CROSSTALK MEASUREMENT RESULT | |
| | TRANSMISSION | RECEPTION | SIGNAL LOCATION | SIGNAL INTENSITY |
| 1 | 1 | 2 | 1.5ms | 0.5V |
| 2 | 2 | 1 | 1.5ms | 0.5V |
| 3 | 2 | 3 | 1.3ms | 0.5V |
| 4 | 3 | 2 | 1.2ms | 0.6V |
| 5 | 3 | 4 | 1.2ms | 0.6V |
| 6 | 4 | 3 | 1.7ms | 0.4V |

FIG. 5

METHOD AND APPARATUS FOR DETERMINING SENSOR INTEGRITY USING SIGNALS FROM AN ADJACENT SENSOR

CROSS REFERENCE TO RELATED APPLICATIONS

The present application is based on and claims the benefit of and priority to Korean Patent Application Number 10-2023-0003015, filed on Jan. 9, 2023, in the Korean Intellectual Property Office, the entire contents of which are incorporated herein by reference.

TECHNICAL FIELD

The present disclosure relates to a method and an apparatus for determining the integrity of a sensor using signals from an adjacent sensor.

BACKGROUND

An ultrasonic sensor for a vehicle functions to measure a distance value to an object around the vehicle in the process of parking at a low speed of 10 km/h or less.

For example, the ultrasonic sensor detects the distance value to a variety of objects. Based on the detected distance value, functions of Parking Distance Warning (PDW), Parking Collision-Avoidance Assist (PCA), and Remote Smart Parking Assist (RSPA) may be implemented in the vehicle.

Ultrasonic sensor signal recognition may be performed by a direct recognition method or an indirect recognition method.

The direct recognition method refers to a method in which an ultrasonic sensor transmits a signal and receives the same signal to calculate a distance value, while the indirect recognition method refers to a method in which a signal transmitted by another ultrasonic sensor is received and a distance value is calculated.

In addition to the signal detected through the direct recognition method or the indirect recognition method, a signal which is directly introduced from an adjacent ultrasonic sensor may also be detected. The signal which is directly introduced from the adjacent ultrasonic sensor is referred to as a crosstalk signal.

Generally, it is not easy to check whether the ultrasonic sensor is sending a waveform properly. At present, typical systems only determine whether the input/output signal of the ultrasonic sensor is disconnected or shorted and whether a sensor cell is covered. It is not easy to implement the function of determining whether the signal of the ultrasonic sensor is being properly output without distortion.

In order to advance an autonomous parking function to fully autonomous driving, it is very important to secure the reliability of the ultrasonic sensor for fail-management and fail-safe.

The foregoing is intended to merely enhance an understanding of the background of the present disclosure, and is not intended to mean that the statements in this section fall within the preview of an existing technology well known to those of ordinary skill in the art.

SUMMARY

In view of the above, the present disclosure provides a method and an apparatus for determining the integrity of a sensor using a signal of an adjacent sensor.

Embodiments of the present disclosure may provide a method and an apparatus that check the integrity of the ultrasonic sensor signal by determining whether the ultrasonic sensor signal is distorted, and determining whether the signal distortion is due to the aging of a single sensor or a change in the surrounding environment such as temperature or humidity.

In an aspect of the present disclosure, an apparatus for determining integrity of a sensor is provided. The apparatus includes a signal transmission unit configured to sequentially operate each of a plurality of ultrasonic sensors mounted on a vehicle to generate respective output signals. The apparatus also includes a signal sensing unit configured to acquire a received value of an adjacent ultrasonic sensor adjacent to each of the plurality of ultrasonic sensors which generate the respective output signals. The apparatus further includes an anomaly determining unit configured to determine whether the received value is abnormal. The apparatus additionally includes a determination-result processing unit configured to perform a response for each of the ultrasonic sensors according to a result of determining anomaly.

In another aspect of the present disclosure, a method of determining integrity of a sensor is provided. The method includes sequentially operating each of a plurality of ultrasonic sensors mounted on a vehicle to generate respective output signals. The method also includes acquiring a received value of an ultrasonic sensor adjacent to each of the ultrasonic sensors which generate the output signals. The method further includes determining whether the received value is abnormal. The method further includes performing a response for each of the ultrasonic sensors according to a result of determining whether the received value is abnormal.

According to embodiments of the present disclosure, when the sensitivity of an ultrasonic sensor is attenuated due to the aging of the ultrasonic sensor in a vehicle, it is possible to immediately express the failure of the ultrasonic sensor to a user, thereby securing the reliability of the object recognition performance of the ultrasonic sensor.

Further, it is possible to solve the problems of misrecognition or non-recognition of obstacles in PCA and RSPA by securing the reliability of an ultrasonic sensor.

By detecting a change in the sensitivity of an ultrasonic sensor due to various environmental changes such as atmospheric temperature and humidity in real time and correcting the received data on the ultrasonic sensor in the traveling situation of a vehicle, it is possible to reduce misrecognition due to the malfunction of the ultrasonic sensor.

BRIEF DESCRIPTION OF THE DRAWINGS

FIG. 4 is a diagram illustrating the operation of an adjacent ultrasonic sensor which obtains a crosstalk received value for each operated ultrasonic sensor, according to an embodiment of the present disclose.

FIG. 5 is a table illustrating an example in which crosstalk reference values for each ultrasonic sensors are converted into a database (DB) and stored in an EEPROM, according to an embodiment of the present disclosure.

DETAILED DESCRIPTION

Figure 1:
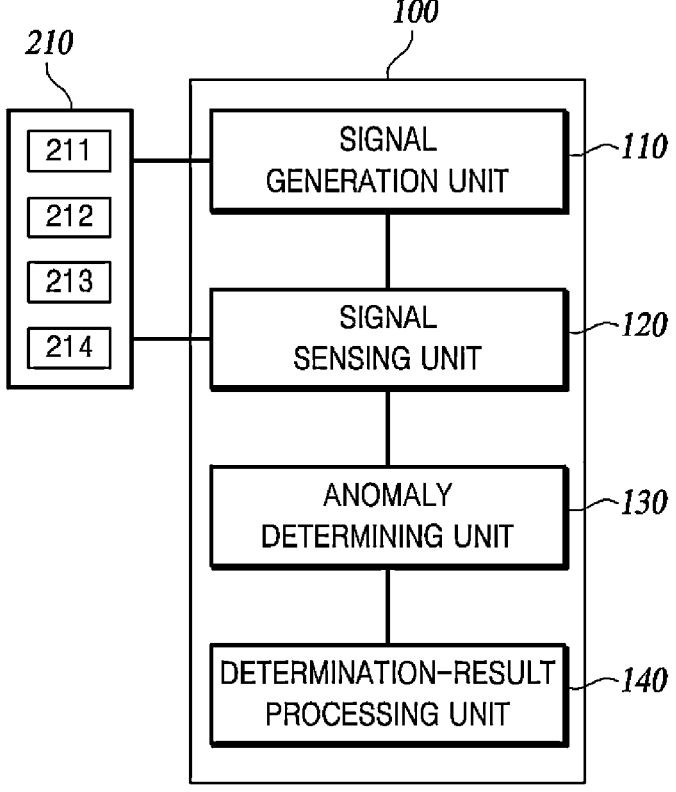
FIG. 1 is a functional block diagram illustrating a plurality of sensors and an apparatus for determining the integrity of a sensor, according to an embodiment of the present embodiment.

Hereinafter, embodiments of the present disclosure are described in detail with reference to the accompanying drawings. In the following description, like reference numerals designate like elements, although the elements may be shown in different drawings. Further, in the following description, where it has been considered that a specific a description of well-known features, functions, or configurations may obscure the gist of the present disclosure, a detailed description thereof has been omitted for the purpose of clarity and brevity.

When a component, device, element, or the like of the present disclosure is described as having a purpose or performing an operation, function, or the like, the component, device, or element should be considered herein as being "configured to" meet that purpose or perform that operation or function.

Figure 2:
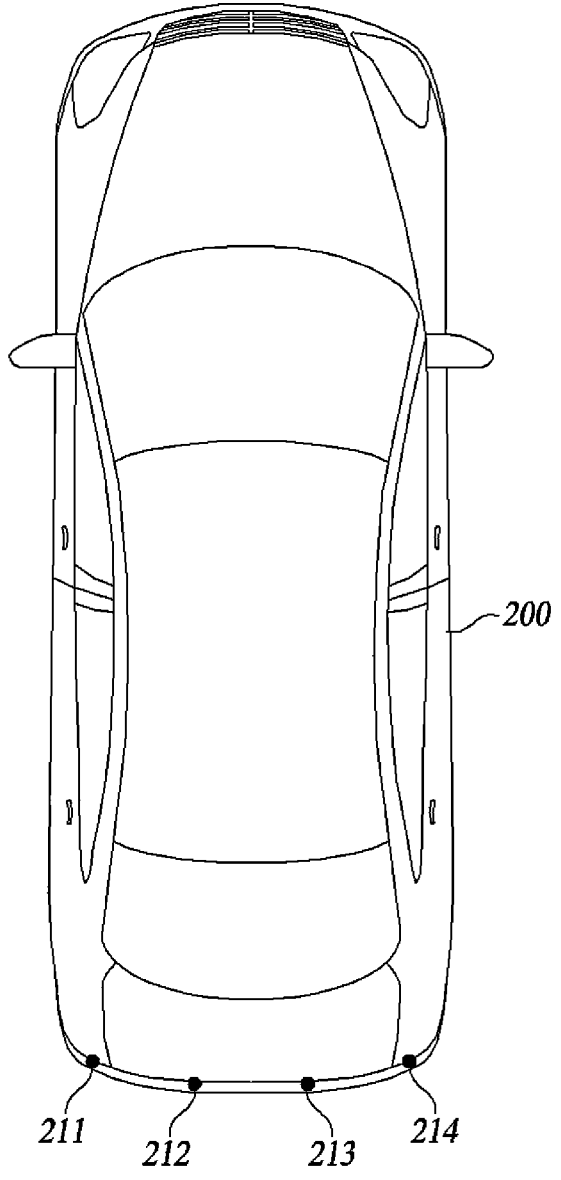
FIG. 2 is a diagram illustrating an example in which a plurality of ultrasonic sensors is installed in a vehicle, according to an embodiment of the present disclosure.

FIG. 1 is afunctional block diagram illustrating a plurality of sensors and an apparatus for determining the integrity of a sensor, according to an embodiment of the present embodiment. FIG. 2 is a diagram illustrating an example in which a plurality of ultrasonic sensors is installed in a vehicle, according to an embodiment of the present disclosure.

Hereinafter, an apparatus for determining the integrity of a sensor according to an embodiment of the present embodiment is described with reference to FIG. 1 and FIG. 2.

A sensor integrity determining apparatus 100 according to an embodiment may include a signal transmission unit 110, a signal sensing unit 120, an anomaly determining unit 130, and a determination-result processing unit 140. In some embodiments, the apparatus may further include an integrity-determining-mode transition unit (not shown). A vehicle 200 is provided with a plurality of ultrasonic sensors 211, 212, 213, and 214, which may be implemented as a component of the sensor integrity determining apparatus 100, according to an embodiment.

Figure 3:
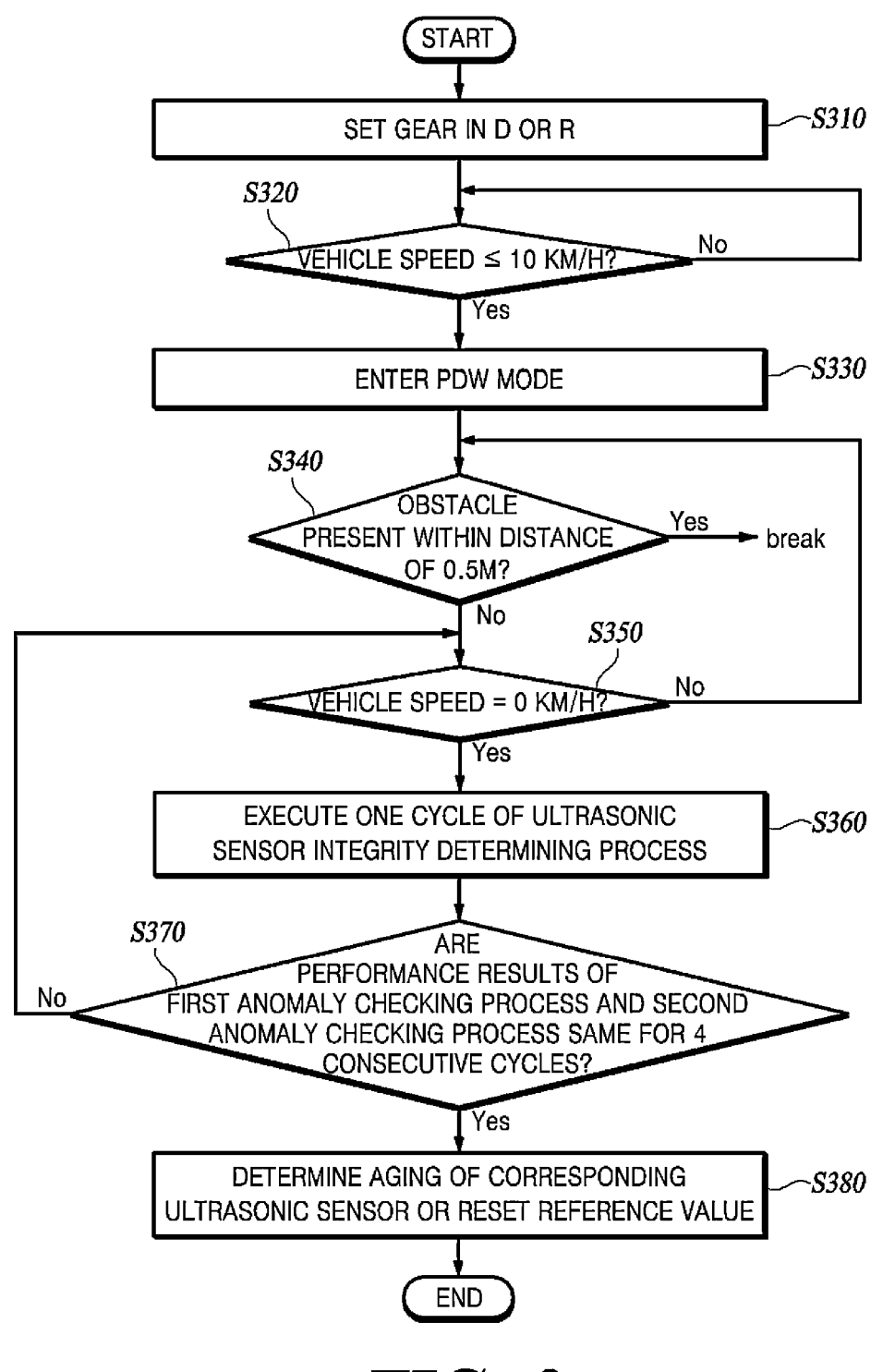
FIG. 3 is a diagram illustrating a process of transitioning to an integrity determining mode of an ultrasonic sensor output signal while the vehicle is traveling, according to an embodiment of the present disclosure.

FIG. 3 is a diagram illustrating a process of transitioning to an integrity determining mode of an ultrasonic sensor output signal a vehicle (e.g., the vehicle 200) is traveling, according to an embodiment.

As shown in FIG. 3, an integrity-determining-mode transition unit (not shown) performs a process of transitioning from a general driving mode to the integrity determining mode of the ultrasonic sensor output signal while the vehicle 200 is traveling, according to an embodiment.

In an operation S310, when the user or autonomous driving software of the vehicle 200 positions a vehicle gear in D or R and the vehicle starts traveling forward or backward, a process for transitioning to the integrity determining mode by an integrity-determining-mode transition unit (not shown) is started.

In an operation S320, after the vehicle 200 starts moving forward or backward, the integrity-determining-mode transition unit (not shown) checks whether the speed of the vehicle 200 is 10 km/h or less.

When the vehicle speed is not 10 km/h or less, the integrity-determining-mode transition unit (not shown) periodically checks whether the vehicle speed is equal to or less than a preset speed (e.g. 10 km/h) while repeating the operation S320.

In an operation S330, when the vehicle speed is 10 km/h or less, the integrity-determining-mode transition unit (not shown) operates the ultrasonic sensors 211, 212, 213, and 214 and puts the vehicle 200 into a Parking Distance Warning (PDW) mode.

In an operation S340, the integrity-determining-mode transition unit (not shown) checks whether there is a surrounding obstacle within a preset distance (e.g., 0.5 m) from received signals of the ultrasonic sensors 211, 212, 213, and 214 while the vehicle 200 is traveling.

When it is confirmed that there is an obstacle around the vehicle 200, the integrity determining mode transition process of the output signal may be stopped, and a related function such as a function to warn the user of the obstacle may be operated.

In an operation 350, when it is confirmed that no obstacle is present within a preset distance around the vehicle 200, the integrity-determining-mode transition unit (not shown) checks whether the vehicle 200 is in a stop state (i.e., vehicle speed is 0 km/h).

When it is confirmed that the vehicle 200 is not in the stop state, the integrity-determining-mode transition unit (not shown) is implemented so that the process returns to the operation S340 and the PDW mode is performed.

In an operation S360, when it is confirmed that the vehicle 200 is in the stop state, one cycle of ultrasonic sensor integrity determining process is executed.

In an operation S370, it is checked whether the performance results of a first anomaly checking process and a second anomaly checking process are the same for 4 consecutive cycles. The execution of the ultrasonic sensor integrity determining process for one cycle and details on checking whether the first anomaly checking process and the second anomaly checking process are the same for 4 consecutive cycles, according to an embodiment, is described in more detail below.

When it is confirmed that the first anomaly checking process and the second anomaly checking process have not been performed for 4 consecutive cycles, the process returns to the operation S350 to continuously check whether the vehicle speed is not 0 km/h.

When it is confirmed that the same result as to whether at least one ultrasonic sensor is an anomaly occurrence ultrasonic sensor is generated by performing the first anomaly checking process and the second anomaly checking process for 4 consecutive cycles, the aging of the corresponding ultrasonic sensor is determined or a reference value is reset in an operation S380. Determination the aging of the ultrasonic sensor and resetting the reference value, according to embodiments, are described in more detail below.

Hereinafter, the process of determining the integrity of the ultrasonic sensor performed by the sensor integrity determining apparatus 100, according to an embodiment, is described.

A plurality of vehicle sensors, e.g., a plurality of ultrasonic sensors 210, may be mounted in a row on the rear surface of the vehicle 200 or other similar positions. Although the vehicle sensors are generally described herein as being ultrasonic sensors, the present disclosure is not limited to the ultrasonic sensor and various other vehicle sensors may be used in other embodiments.

The signal transmission unit 110 sequentially operates the plurality of ultrasonic sensors 210 mounted on the vehicle 200, e.g., each of the ultrasonic sensors 211, 212, 213, and 214, to generate each output signal (also referred to herein as "transmission signal").

Whenever each output signal is transmitted, the signal sensing unit 120 acquires the received value (also referred to herein as "crosstalk received value") of a crosstalk signal of an ultrasonic sensor adjacent to each ultrasonic sensor 211, 212, 213, or 214.

The adjacent ultrasonic sensor may be another ultrasonic sensor located around the ultrasonic sensor 211, 212, 213, or 214 generating the corresponding output signal. For example, the signal sensing unit 120 acquires the crosstalk received values of two adjacent ultrasonic sensors 211 and 213 when the output signal of the second ultrasonic sensor 212 is transmitted.

Depending on the shape in which the plurality of ultrasonic sensors 211, 212, 213, and 214, are arranged, the adjacent ultrasonic sensor of each ultrasonic sensor 211, 212, 213, or 214 may be determined as the nearest left ultrasonic sensor and the nearest right ultrasonic sensor of the ultrasonic sensor which generates the corresponding output signal.

As shown in FIG. 2, the adjacent sensor of the first ultrasonic sensor 211 is the second ultrasonic sensor 212 which is the nearest right sensor, the adjacent sensors of the second ultrasonic sensor 212 are the first ultrasonic sensor 211 which is the nearest left sensor and the third ultrasonic sensor 213 which is the nearest right sensor, the adjacent sensors of the third ultrasonic sensor 213 are the second ultrasonic sensor 212 which is the nearest left sensor and the fourth ultrasonic sensor 214 which is the nearest right sensor, and the adjacent sensor of the fourth ultrasonic sensor 214 is the third ultrasonic sensor 213 which is the nearest left sensor.

Although the positions of the ultrasonic sensors 211, 212, 213, and 214 are expressed as the left and right sides in this embodiment, the present disclosure is not limited thereto, and it can be understood that the left side is a first direction, and the right side is a second direction different from the first direction.

The signal transmission unit 110 sequentially operates the ultrasonic sensors 211, 212, 213, and 214 while the vehicle 200 is traveling. For instance, the signal transmission unit 110 sequentially operates the first ultrasonic sensor 211, the second ultrasonic sensor 212, the third ultrasonic sensor 213, and the fourth ultrasonic sensor 214 in the order listed at time intervals to transmit each output signal. In an embodiment, when one ultrasonic sensor transmits an output signal, another ultrasonic sensor does not transmit an output signal and may receive a signal (i.e. crosstalk signal) from another ultrasonic sensor.

FIG. 4 is a diagram illustrating the operation of an adjacent ultrasonic sensor which obtains a crosstalk received value for each operated ultrasonic sensor, according to an embodiment.

As shown in FIG. 4, the signal sensing unit 120 acquires the crosstalk received value from the second ultrasonic sensor 212 which is the nearest right sensor when the first ultrasonic sensor 211 transmits the output signal. The signal sensing unit 120 also acquires the crosstalk received values from the first ultrasonic sensor 211 which is the nearest left sensor and the third ultrasonic sensor 213 which is the nearest right sensor when the second ultrasonic sensor 212 transmits the output signal. The signal sensing unit 120 additionally acquires the crosstalk received values from the second ultrasonic sensor 212 which is the nearest left sensor and the fourth ultrasonic sensor 214 which is the nearest right sensor when the third ultrasonic sensor 213 transmits the output signal. The signal sensing unit 120 further acquires the crosstalk received value from the third ultrasonic sensor 213 which is the nearest left sensor when the fourth ultrasonic sensor 214 transmits the output signal.

The anomaly determining unit 130 may determine whether the crosstalk received value of the adjacent ultrasonic sensor of the corresponding ultrasonic sensor is abnormal whenever the output signal of each of the ultrasonic sensors 211, 212, 213, and 214 which are sequentially operated is transmitted.

The anomaly of the crosstalk received value may be determined based on the crosstalk reference values set for each of the ultrasonic sensors 211, 212, 213, and 214. As used herein, the expression "reference value" in the following description means a crosstalk reference value.

The reference value for each of the ultrasonic sensors 211, 212, 213, and 214 may be determined in the development step of the vehicle 200.

When the vehicle 200 is developed, output signals may be sequentially generated for each of the ultrasonic sensors 211, 212, 213, and 214 mounted on the vehicle, the reference values for the crosstalk received value, such as the signal level of a crosstalk receiving wave sensed normally by each ultrasonic sensor adjacent to the ultrasonic sensor generating the corresponding output signal, and the sensing time value, waveform, and peak value of the crosstalk received signal may be converted into a database (DB) in advance and stored in an Electrically Erasable Programmable Read-Only Memory (EEPROM) in the vehicle 200.

FIG. 5 is a table illustrating an example in which crosstalk reference values for ultrasonic sensors are converted into the DB and stored in the EEPROM, according to an embodiment.

In the table of FIG. 5, the list number indicates the number of each crosstalk received value, operating sensor numbers 1 to 4 indicates the first to fourth ultrasonic sensors 211, 212, 213, and 214, respectively, and crosstalk received values received by adjacent ultrasonic sensors due to transmission ultrasonic sensors corresponding to list numbers 1 to 6 are referred to as first to sixth crosstalk received values.

A reference value is determined by measuring the normal crosstalk received signal from the adjacent ultrasonic sensor of each ultrasonic sensor (i.e., a transmission ultrasonic sensor) generating the output signal under environmental conditions such as preset temperature and humidity.

This reference value is stored in the DB in the form as shown in FIG. 5 in the EEPROM of the vehicle 200, in an embodiment. In order to reliably determine the integrity of the crosstalk received signal for each of the ultrasonic sensors 211, 212, 213, and 214, the DB stored in the EEPROM is referred to and used as a reference value for determining the integrity.

In an embodiment, a signal location in the DB of FIG. 5 is a time from when the output signal is generated in the transmission ultrasonic sensor until the peak value of the crosstalk received signal is sensed in the adjacent ultrasonic sensor.

When it is determined that there is no obstacle adjacent to each of the ultrasonic sensors 211, 212, 213, and 214 and the vehicle 200 is in the stop state, the signal transmission unit 110 sequentially operates each of the ultrasonic sensors 211, 212, 213, and 214.

As described above, when the ultrasonic sensors sequentially transmit output signals one by one, other ultrasonic sensors do not transmit output signals while the ultrasonic sensor transmitting the output signal transmits the output signal, in an embodiment.

As shown in the example of FIG. 4 and FIG. 5, when the ultrasonic sensors 211, 212, 213, and 214 are arranged as shown in FIG. 2, the signal sensing unit 120 acquires six crosstalk received values from the ultrasonic sensors 211, 212, 213, and 214.

For example, the signal sensing unit 120 sequentially acquires six crosstalk received values, such as the crosstalk received value of the second ultrasonic sensor 212 generated during the operation of the first ultrasonic sensor 211, the crosstalk received value of the first ultrasonic sensor 211 generated during the operation of the second ultrasonic sensor 212, and the crosstalk received value of the third ultrasonic sensor 213, from each of the ultrasonic sensors 211, 212, 213, and 214.

When an error (i.e., first error) equal to or greater than a first threshold value (e.g., 0.5V) compared to a corresponding reference value occurs in the crosstalk received value of the adjacent ultrasonic sensor, the anomaly determining unit 130 may perform the process of determining the crosstalk received value of the adjacent ultrasonic sensor as the first abnormal signal value, determining the corresponding transmission ultrasonic sensor as the anomaly occurrence ultrasonic sensor, and transmitting information on the anomaly occurrence ultrasonic sensor including the identifier of the anomaly occurrence ultrasonic sensor and the first error to the determination-result processing unit 140. Such a process is sometimes referred herein to as a "first anomaly checking process." In an embodiment, the error equal to or greater than the first threshold value compared to the corresponding reference value in the crosstalk received value of the adjacent ultrasonic sensor is an error (also referred to herein as "a negative error") of the crosstalk received value of the adjacent ultrasonic sensor having a value smaller than the corresponding reference value or an error (also referred to herein as "a positive error") of the crosstalk received value of the adjacent ultrasonic sensor having a value larger than the corresponding reference value.

The anomaly determining unit 130 may sequentially execute the first anomaly checking process for the first to sixth crosstalk received values to check whether the error equal to or greater than the first threshold value compared to each corresponding reference value occurs.

The determination-result processing unit 140 may check the information of the anomaly occurrence ultrasonic sensor and takes no action on the corresponding transmission ultrasonic sensor for the crosstalk signal which does not have the first abnormal signal value.

When it is determined by the anomaly determining unit 130 that one crosstalk signal among the received values of all target crosstalk signals has the first abnormal signal value, the determination-result processing unit 140 may request second abnormal signal value information from the anomaly determining unit 130.

Further, when the second abnormal signal value information is requested and the crosstalk received value of the adjacent ultrasonic sensor of each ultrasonic sensor 211, 212, 213, or 214 has an error (i.e. second error) equal to or greater than a second threshold value (i.e. 0.3V) compared to the reference value, the anomaly determining unit 130 may determine the received value of the corresponding adjacent ultrasonic sensor as the second abnormal signal value. The anomaly determining unit 130 may transmit to the determination-result processing unit 140 the second abnormal signal value information, including the identifier of the crosstalk received value (i.e., the second abnormal signal value) in which an error equal to or greater than the second threshold value compared to the corresponding reference value for each crosstalk received value occurs and the corresponding second error. Such a process is sometimes referred herein to as "a second anomaly checking process." In an embodiment, when the first error is a negative error, the error of the crosstalk received value of the adjacent ultrasonic sensor having a value smaller than the corresponding reference value may be calculated as the second error. When the first error is a positive error, the error of the crosstalk received value of the adjacent ultrasonic sensor having a value larger than the corresponding reference value may be calculated as the second error.

For example, in the case of FIG. 5, the anomaly determining unit 130 may check whether an error equal to or greater than the second threshold value compared to the corresponding reference value has occurred in all six crosstalk received values, and then obtain one to six second anomaly signal values.

In this regard, the first threshold value is larger than the second threshold value. Unless specified otherwise in the following description, it is assumed that the first threshold value is 0.5V and the second threshold value is 0.3V.

When the second abnormal signal value information is requested, the anomaly determining unit 130 may check whether the second error has occurred for the rest of the crosstalk signals excluding the crosstalk signal corresponding to the first abnormal signal value among the crosstalk signals of the adjacent ultrasonic sensors, and to determine the second abnormal signal value.

When the number of second abnormal signal values is less than a threshold number, the determination-result processing unit 140 may determine the ultrasonic sensor corresponding to the first abnormal signal value as the anomaly occurrence sensor. The number of second abnormal signal values being less than the threshold number even though the first abnormal signal value has occurred may mean that there are no anomalies in the other ultrasonic sensors and that an anomaly occurred only in the anomaly occurrence ultrasonic sensor corresponding to the first abnormal signal value.

For example, when the second ultrasonic sensor 212 transmits the output signal in order to acquire the crosstalk received value for the second ultrasonic sensor 212, the first and third ultrasonic sensors 211 and 213 which are receiving ultrasonic sensors corresponding to list numbers 1 and 3 of FIG. 5, respectively, obtain crosstalk received values.

The anomaly determining unit 130 may check the crosstalk received value of the crosstalk signal received by each of the first and third ultrasonic sensors 211 and 213. The anomaly determining unit 130 may also check whether each of the crosstalk received values of the first and third ultrasonic sensors 211 and 213 corresponds to the first abnormal signal value.

When neither of the crosstalk received values of the first and third ultrasonic sensors 211 and 213 correspond to the first abnormal signal value, the determination-result processing unit 140 may determine the second ultrasonic sensor 212 which has transmitted the output signal as the normal ultrasonic sensor.

When at least one of the crosstalk received values of the first and third ultrasonic sensors 211 and 213 corresponds to the first abnormal signal value, the determination-result processing unit 140 may request the anomaly determining unit 130 to transmit the second abnormal signal value information.

When the transmission of the second abnormal signal value information is requested, the anomaly determining unit 130 may sequentially operate each of the ultrasonic sensors 211, 212, 213, and 214 one by one to generate the ultrasonic output signal. The anomaly determining unit 130 may acquire the crosstalk received value from each adjacent ultrasonic sensor of the corresponding ultrasonic sensor whenever the output signal of one ultrasonic sensor is generated.

The anomaly determining unit 130 may acquire the crosstalk received value from the adjacent second ultrasonic sensor 212 to check whether the crosstalk received value of the second ultrasonic sensor 212 is the second abnormal signal value when the first ultrasonic sensor 211 generates the output signal. The anomaly determining unit 130 may acquire the crosstalk received value from each of the adjacent first and third ultrasonic sensors 211 and 213 to check whether the crosstalk received value of each of the first and third adjacent ultrasonic sensors 211 and 213 is the second abnormal signal value when the second ultrasonic sensor 212 generates the output signal. The anomaly determining unit 130 may acquire the crosstalk received value from each of the adjacent second and fourth ultrasonic sensors 212 and 214 to check whether the crosstalk received value of each of the second and fourth ultrasonic sensors 212 and 214 is the second abnormal signal value when the third ultrasonic sensor 213 generates the output signal. The anomaly determining unit 130 may acquire the crosstalk received value from the adjacent third ultrasonic sensor 213 to check whether the crosstalk received value of the third ultrasonic sensor 213 is the second abnormal signal value when the fourth ultrasonic sensor 214 generates the output signal.

After the anomaly determining unit 130 sequentially operates each of the ultrasonic sensors 211, 212, 213, and 214 one by one to generate the ultrasonic output signal, the anomaly determining unit 130 may transmit the second abnormal signal value information including the identifier of the acquired second abnormal signal value, the number of second abnormal signal values, and the second error to the determination-result processing unit 140.

When it is confirmed that the number of second abnormal signal values is less than a threshold number, the determination-result processing unit 140 having received the second abnormal signal value information may determine that the second ultrasonic sensor 212 corresponding to the first abnormal signal value is the anomaly occurrence ultrasonic sensor. This is because when the number of second abnormal signal values is less than the threshold number, it can be determined that ultrasonic sensors other than the second ultrasonic sensor 212 have no problems and that only the second ultrasonic sensor 212 has a problem.

In an embodiment, the anomaly determining unit 130 sequentially performs the first anomaly checking process for each of the first to fourth ultrasonic sensors 211, 212, 213, and 214, receives a request for the information of the second abnormal signal value from the determination-result processing unit 140 whenever the first abnormal signal value is checked when each first anomaly checking process is performed, acquires the information of the second abnormal signal value, and transmits the information of the second abnormal signal value. In an embodiment, completion of the second anomaly checking process for all of the first to fourth ultrasonic sensors 211, 212, 213, and 214, it is defined as one cycle of integrity determination process.

When a specific ultrasonic sensor is determined as an anomaly occurrence ultrasonic sensor for 4 or more consecutive cycles as the result of performing the integrity determining process for 4 or more cycles, the determination-result processing unit 140 may determine that the anomaly occurrence ultrasonic sensor is aged. Although it is described herein that the integrity determination process is performed for 4 or more cycles, the number of cycles of the integrity determination process for determining whether the ultrasonic sensor is aged may vary depending on the embodiment.

In an embodiment, when it is determined that the second ultrasonic sensor is aged, the determination-result processing unit 140 may use a method of informing a corresponding user interface of the need for replacement due to the aging of the second ultrasonic sensor, using an alarm or the like.

When the anomaly occurrence ultrasonic sensor is identified and the number of second abnormal signal values exceeds a threshold number, the determination-result processing unit 140 may reset a reference value for each of the plurality of ultrasonic sensors 211, 212, 213, and 214. In an embodiment, even in the case that the same ultrasonic sensor is continuously identified as the anomaly occurrence ultrasonic sensor for the integrity determination process cycle (e.g., 4 cycles) and the number of second abnormal signal values exceeds the threshold number, the determination-result processing unit 140 may reset the reference value for each of the plurality of ultrasonic sensors 211, 212, 213, and 214.

The determination-result processing unit 140 may calculate the average of second errors. The determination-result processing unit 140 may add the calculated average of second errors to each current reference value to determine the resulting value as a new reference value corresponding to each ultrasonic sensor 211, 212, 213, or 214.

In other words, each reference value may be reset by adding the average of second errors to the reference value of the first ultrasonic sensor 211, adding the average of second errors to the reference value of the second ultrasonic sensor 212, adding the average of second errors to the reference value of the third ultrasonic sensor 213, and adding the average of second errors to the reference value of the fourth ultrasonic sensor 214.

For example, if second errors equal to or greater than the second threshold value occur between the second abnormal signal values corresponding to the transmitting ultrasonic sensors and the receiving ultrasonic sensors of list Nos. 2 to 5 in FIG. 5 and the corresponding reference values, and the second errors are +0.5V, +1.1V, +0.4V, and +0.5V, respectively, the average of variation (i.e., second error) of the second abnormal signal value becomes 0.625V.

The determination-result processing unit 140 may calculate a new reference value of each of the ultrasonic sensors 211, 212, 213, and 214 by adding the average value of variation to the reference value of each of the ultrasonic sensors 211, 212, 213, and 214, and may store the new reference values in the DB of the EEPROM. The determination-result processing unit 140 may increase the magnitude of the reference value by the variation when each of the first and second errors has a positive error, and reduces the magnitude of the reference value by the variation when each of the first and second errors has a negative error.

For instance, a value obtained by adding the variation average of 0.625V to the existing reference value of the first ultrasonic sensor becomes a new reference value of the first ultrasonic sensor, a value obtained by adding the variation average of 0.625V to the existing reference value of the second ultrasonic sensor becomes a new reference value of the second ultrasonic sensor, a value obtained by adding the variation average of 0.625V to the existing reference value of the third ultrasonic sensor becomes a new reference value of the third ultrasonic sensor, and a value obtained by adding the variation average of 0.625V to the existing reference value of the fourth ultrasonic sensor becomes a new reference value of the fourth ultrasonic sensor.

The reason that the first threshold value is greater than the second threshold value may be that a magnitude of anomaly of the output of the ultrasonic sensor due to the environmental change is somewhat low, whereas a case where the output of the ultrasonic sensor changes greatly may most likely be a case where anomaly occurs in the ultrasonic sensor itself.

Although it has been described that the operation of reporting the aging of the ultrasonic sensor or resetting the reference value is performed by comparing the number of second abnormal signal values with the threshold number, it is possible to perform the operation of reporting the aging of the ultrasonic sensor or resetting the reference value by comparing the number of ultrasonic sensors corresponding to second abnormal signal values, instead of the number of second abnormal signal values, with the threshold number.

In an embodiment, according to the flowchart of FIG. 3, when a vehicle speed exceeds 0 km/h during the integrity determination process, or a surrounding object is detected, the vehicle immediately performs the PDW mode.

Figure 6:
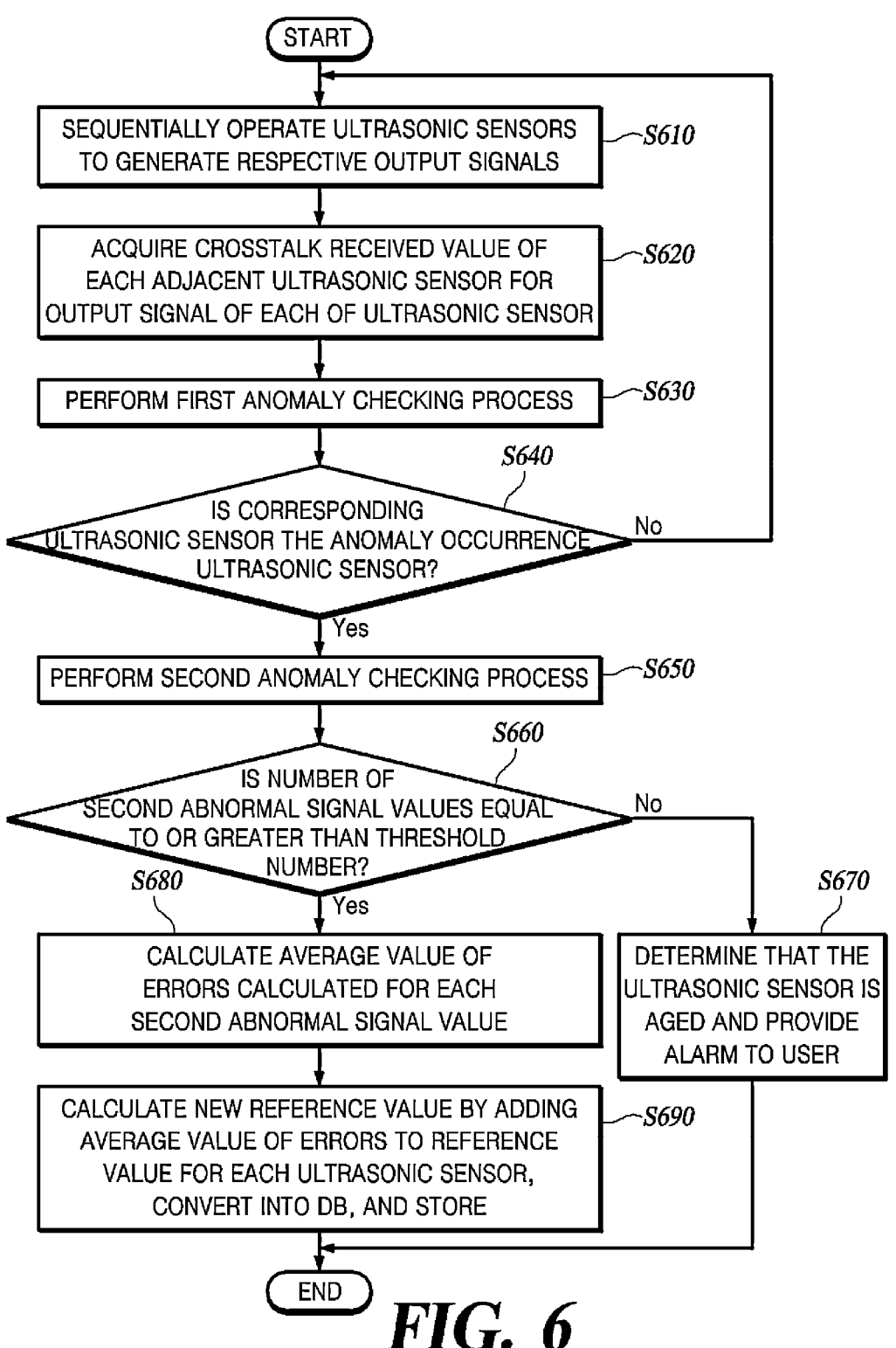
FIG. 6 is a flowchart illustrating a method of determining the integrity of a sensor, according to an embodiment of the present embodiment.

FIG. 6 is a flowchart illustrating a method of determining the integrity of a sensor, according to an embodiment of the present embodiment.

Hereinafter, the method of determining the integrity of the sensor according to an embodiment of the present embodiment is described with reference to FIGS. 1 to 6.

In an operation S610, the signal transmission unit 110 sequentially operates each of the plurality of ultrasonic sensors 211, 212, 213, and 214 mounted on the vehicle to generate each output signal.

In an operation S620, the signal sensing unit 120 acquires the crosstalk received value of each adjacent ultrasonic sensor for the output signal of each of the ultrasonic sensors 211, 212, 213, and 214. In an embodiment, when one ultrasonic sensor generates an output signal, the other ultrasonic sensors do not generate the output signal.

Whenever the output signal of each of the sequentially operated ultrasonic sensors 211, 212, 213, and 214 is transmitted, in an operation S630, the anomaly determining unit 130 determines whether an anomaly of the crosstalk received value of the adjacent ultrasonic sensor of the corresponding ultrasonic sensor occurs.

In the operation S630, the anomaly determining unit 130 performs the first anomaly checking process. The anomaly determining unit 130 determines whether an anomaly occurred in each crosstalk received value based on of the reference value which is set for each of the ultrasonic sensors 211, 212, 213, and 214. For example, the anomaly determining unit 130 determines whether each crosstalk received value corresponds to the first abnormal signal value, which is the crosstalk received value with an error equal to or greater than the first threshold value compared to the reference value.

In an operation S640, the determination-result processing unit 140 confirms whether the corresponding ultrasonic sensor is the anomaly occurrence ultrasonic sensor.

When it is confirmed that the corresponding ultrasonic sensor is not the anomaly occurrence ultrasonic sensor in the operation S640, the process returns to the operation S610 to generate the output signal for the next ultrasonic sensor.

When it is confirmed in the operation S640 that the corresponding ultrasonic sensor is the anomaly occurrence ultrasonic sensor, the second anomaly checking process is performed by the anomaly determining unit 130 in an operation S650. For example, when an error equal to or greater than the second threshold value (e.g., 0.3 V) compared to the reference value corresponding to the crosstalk received value of the adjacent ultrasonic sensor occurs, the anomaly determining unit 130 determines the received value of the corresponding adjacent ultrasonic sensor as the second abnormal signal value.

In an operation S660, the determination-result processing unit 140 checks whether the number of second abnormal signal values is equal to or greater than the threshold number S660.

When the number of second abnormal signal values is less than the threshold number, in an operation S670, the determination-result processing unit 140 determines that the corresponding ultrasonic sensor is aged and provides an alarm to the user.

When the number of second abnormal signal values is equal to or greater than the threshold number, in an operation S680, the determination-result processing unit 140 calculates the average value of the error calculated for each second abnormal signal value.

In an operation S690, the determination-result processing unit 140 calculates a new reference value by adding the average value of the errors of the second abnormal signal values calculated in the operation S680 to the reference value for each ultrasonic sensor, converts the new reference value into the DB, and then stores the new reference value. Accordingly, when the average value of the errors is a positive (+) value, the magnitude of the reference value increases. When the average value of the errors is a negative (−) value, the magnitude of the reference value decreases.

Various functions or methods described in the present disclosure may be implemented as instructions stored in a non-transitory recording medium which may be read and executed by one or more processors. The non-transitory recording medium includes, for example, various types of recording devices in which data is stored in a form readable by a computer system. For example, the non-transitory recording medium includes a storage medium such as an erasable programmable read only memory (EPROM), a flash drive, an optical drive, a magnetic hard drive, or a solid state drive (SSD).

In the above description, it should be understood that embodiments may be implemented in many different ways. Functions described in one or more examples may be implemented in hardware, software, firmware, or any combination thereof. It should be understood that functional components described in the description have been labeled as " . . . unit" to particularly emphasize their implementation independence.

Although embodiments of the present disclosure have been described for illustrative purposes, those having ordinary skill in the art should appreciate that various modifications, additions, and substitutions are possible, without departing from the idea and scope of the present disclosure. Embodiments of the present disclosure have been described for the sake of brevity and clarity. The scope of the technical idea of the present embodiments is not limited by the described embodiments. Accordingly, one having ordinary skill in the art should understand that the scope of the present disclosure is not to be limited by the above explicitly described embodiments but by the claims and equivalents thereof.

What is claimed is:

1. An apparatus for determining integrity of a sensor, the apparatus comprising:

a signal transmission unit configured to sequentially operate each of a plurality of ultrasonic sensors mounted on a vehicle to generate respective output signals;

a signal sensing unit configured to acquire a received value of an adjacent ultrasonic sensor adjacent to each of the plurality of ultrasonic sensors that generate the respective output signals;

an anomaly determining unit configured to determine whether the received value is abnormal; and a determination-result processing unit configured to perform a response for each of the ultrasonic sensors according to a result of determining anomaly, wherein the determination-result processing unit is configured to reset each reference value for each of the ultrasonic sensors when i) an error equal to or greater than a first threshold value compared to the reference value occurs in the received value of an ultrasonic sensor adjacent to any one of the ultrasonic sensors generating the output signal and ii) a number of received values having an error equal to or greater than a second threshold value compared to the reference value among received values of ultrasonic sensors adjacent to each of the ultrasonic sensors is equal to or greater than a threshold number, wherein the determination-result processing unit is configured to calculate, as a variation, an average of errors for each of the received values having an error equal to or greater than the second threshold value compared to the reference value, and calculate a new reference value for each of the plurality of ultrasonic sensors based on the variation.

2. The apparatus of claim 1, wherein the signal transmission unit is configured to sequentially operate each of the ultrasonic sensors while the vehicle is traveling, wherein each of the ultrasonic sensors are sequentially operated when no obstacles are determined to be present around each of the ultrasonic sensors and the vehicle is determined to be in a stopped state.

3. The apparatus of claim 1, wherein:

the plurality of ultrasonic sensors is mounted in a row on the vehicle, and the adjacent ultrasonic sensor is determined as a nearest first direction ultrasonic sensor or a nearest second direction ultrasonic sensor of an ultrasonic sensor generating an output signal based on a structure in which the plurality of ultrasonic sensors is mounted.

4. The apparatus of claim 1, wherein the determination-result processing unit is configured to reset a reference value corresponding to each of the plurality of ultrasonic sensors according to a number of received values in which anomaly has occurred, wherein each of the reference values is a value for determining whether the received value corresponding to each of the plurality of ultrasonic sensors is abnormal.

5. The apparatus of claim 1, wherein the determination-result processing unit is configured to determine that any one of the ultrasonic sensors is aged when i) an error equal to or greater than a first threshold value compared to the reference value occurs in the received value of an ultrasonic sensor adjacent to any one of the ultrasonic sensors generating the output signal, and ii) the number of received values having an error equal to or greater than a second threshold value compared to the reference value among received values of ultrasonic sensors adjacent to each of the ultrasonic sensors is less than a threshold number.

6. The apparatus of claim 5, wherein the first threshold value is greater than the second threshold value.

7. The apparatus of claim 1, wherein the determination-result processing unit is configured to:

increase a magnitude of the reference value by a magnitude of the variation when the received value of the ultrasonic sensor adjacent to any one of the ultrasonic sensors is greater than the reference value, and decrease the magnitude of the reference value by the magnitude of the variation when the received value of the ultrasonic sensor adjacent to any one of the ultrasonic sensors is less than the reference value.

8. The apparatus of claim 1, wherein the apparatus for determining integrity of the sensor i) is operated when the vehicle is in a stopped state and ii) stops operating and controls the vehicle so that a Parking Distance Warning (PDW) mode is performed when the vehicle is not in the stopped state.

9. A method of determining integrity of a sensor, the method comprising:

sequentially operating each of a plurality of ultrasonic sensors mounted on a vehicle to generate respective output signals;

acquiring a received value of an ultrasonic sensor adjacent to each of the ultrasonic sensors which generate the output signals;

determining whether the received value is abnormal;

performing a response for each of the ultrasonic sensors according to a result of determining whether the received value is abnormal; and resetting each reference value for each of the ultrasonic sensors based on determining that i) an error equal to or greater than a first threshold value compared to the reference value occurs in the received value of an ultrasonic sensor adjacent to any one of the ultrasonic sensors generating the output signal and ii) a number of received values having an error equal to or greater than a second threshold value compared to the reference value among received values of ultrasonic sensors adjacent to each of the ultrasonic sensors is equal to or greater than a threshold number, wherein resetting each reference value for each of the ultrasonic sensors includes calculating, as a variation, an average of errors for each of the received values having an error equal to or greater than the second threshold value compared to the reference value, and calculating a new reference value for each of the plurality of ultrasonic sensors based on the variation.

* * * * *